United States Patent [19]

Cooper

[11] Patent Number: 4,891,072
[45] Date of Patent: Jan. 2, 1990

[54] MULTI-COMPONENT GROUTING SYSTEM

[75] Inventor: John Cooper, Dundonald, Scotland

[73] Assignee: Imperial Chemical Industries PLC, London, England

[21] Appl. No.: 511,003

[22] Filed: Jul. 5, 1983

[30] Foreign Application Priority Data

Jul. 23, 1982 [GB] United Kingdom ............... 8221417

[51] Int. Cl.$^4$ ................. C04B 7/02; C04B 24/00; C04B 24/08
[52] U.S. Cl. .................................. 106/90; 106/95; 166/293; 405/261
[58] Field of Search .................. 106/90, 111, 116, 95; 166/293; 405/261

[56] References Cited

U.S. PATENT DOCUMENTS

| | | | |
|---|---|---|---|
| 2,526,538 | 10/1950 | Camp | 106/116 |
| 2,878,875 | 3/1959 | Dunlap et al. | 106/90 |
| 3,324,663 | 6/1967 | McLean | 405/261 |
| 4,042,409 | 8/1977 | Terada et al. | 106/116 |
| 4,094,694 | 6/1978 | Long | 106/116 |
| 4,126,009 | 11/1978 | Tomic | 106/90 |
| 4,127,001 | 11/1978 | Tomic | 106/90 |

FOREIGN PATENT DOCUMENTS 3011859 3/1980 Fed. Rep. of Germany ...... 106/111

Primary Examiner—William R. Dixon, Jr.
Assistant Examiner—Susan Hollenbeck
Attorney, Agent, or Firm—Cushman, Darby & Cushman

[57] ABSTRACT

A multi-component grouting system having at least one component wherein the active ingredient is contained in the dispersed phase of a water-in-oil emulsion, the oil providing an effective barrier against mixing of the components thereby enabling the components to be stored indefinitely in direct contact. The components may advantageously be encapsulated in a single compartment frangible casing for insertion into drillholes in rock. The grouting systems may be based on compositions comprising hardenable resins, Portland cement, Plaster of Paris, zinc oxide/zinc chloride, or sodium silicate.

By eliminating the usual plastics film barrier between the grouting system components, intimate mixing of the components in a drillhole by rotation of the bolt to be fixed in the drillhole may be more easily and reliably effected.

25 Claims, No Drawings

MULTI-COMPONENT GROUTING SYSTEM

This invention relates to improved multi-component grouting systems of the kind adapted to provide a setting composition when the components are intimately mixed together. The invention also relates to a method of preparing multi-component grouting compositions and to a method of forming a hardened grouting material in a cavity, for example to secure an element in the cavity using such grouting compositions.

The preparation and use of multi-component grouting compositions are well known particularly for stabilizing and reinforcing rock formation. Thus the grouting of rock supporting elements such as anchor bolts or dowels in drillholes in rock formations, for example in mines and tunnels, is widespread. In this application the components of a grouting system are placed in the drillhole and are either premixed, or are mixed by rotating the element as the element is inserted into the drill-hole. The mixed grouting composition surrounds at least an end portion of the element and sets in situ to bind the element to the drillhole wall. The premixed grouting compositin may be pumped into the drillhole but in an especially advantageous method the components are encapsulated in separate compartments of a frangible container which is inserted into the drillhole and ruptured by the insertion of the strengthening element to mix the components. Encapsulated multi-component grouting systems have been described in British Patent Specifications Nos. 998,240 and 1,297,554.

One system generally in use is a two-component system comprising polyester resin as the active ingredient of one component in an outer casing of synthetic plastics film and a hardening catalyst for the resin as the active ingredient of a second component in an inner casing of synthetic plastics film. Further systems in use involve Portland cement and Plaster of Paris (calcium sulphate hemihydrate) as the active ingredient of one component with water as the active ingredient of a second component. A more recent advantageous system is described in British Patent Specification No. 1,538,102 which contains a set retarded paste comprising Plaster of Paris and an aqueous solution of polyacrylic acid, or a derivative thereof, as one component and a water soluble iron, copper or aluminium salt as the active ingredient of a second component which inactivates the retarder thereby permitting rapid setting of the plaster.

A disadvantage with multi-component capsules is that the inner casing must be of a plastics material which is impermeable to the active components contained therein, ad is generally made of a strong material such as polyester. It is sometimes difficult to break this inner casing by a rotating bolt or dowel sufficiently to permit satisfactory mixing of the components of the grouting compositin. Moreover multi-component capsules are not easily made in diameters of less than 2 centimeters thus precluding their use for many purposes. Clearly it would be desirable to render inner casings unnecessary by providing an alternative barrier between the active ingredients of the grouting system. In British Patent Specification No. 1,127,913 a cartridge is described which contains resin and hardener components side by side in contact in a single compartment, the barrier between the resin and hardener being provided by the thin layer of polymerised resin which initially forms at the interface of the components. However, in this cartridge there is a continual slow but significant diffusion of the hardener catalyst through the interfacial barrier, the diffusion rate increasing with increasing temperature, so that the storage life of the grouting composition is limited. Moreover the method of forming the interfacial barrier is only applicable to resin grouting systems and the barrier itself tends to be brittle, resulting in premature setting if the cartridges are handled roughly.

It is an object of this invention to provide an imroved multi-component grouting system which does not require a strong film barrier between the components. We have found that when at least one component of a multi-component grouting system contains its active ingredient in the dispersed phase of a water-in-oil emulsion, the oil phase of the emulsion acts as a protective barrier to prevent diffusion of the active ingredient. The components can then be stored in direct contact indefinitely until the emulsion is broken and the active ingredient is released to react with the remaining component or components of the grouting system to effect the desired setting. By 'water-in-oil' emulsion we mean an emulsion of a polar liquid in a liquid of lower dielectric constant; it will be understood that, in addition to water, polar liquids such as alcohols, glycols and amides can be emulsified in many organic liquids.

Thus in according with this invention a multi-component grouting system comprises at least one component wherein the active ingredient is contained in the dispersed phase of a water-in-oil emulsion. The oil of the continuous phase of the emulsion provides an especially effective barrier against diffusion of ions and consequently the invention is especially advantageous for grouting systems containing ionic active ingredients, for example some hardening catalysts for inorganic cements. Since the components of the grouting system can be stored in contact, the required components may be loaded into a drillhole and left in direct contact therein until setting is required. Setting may be effected at any time by mixing the components together under shear conditions to break the emulsion and release the active constituents. In an encapsulated system the components are advantageously contained in direct contact in a single-compartment frangible casing, for example a casing of synthetic plastics film such as polyethylene, which casing may if necessary be of small diameter. The components may for example be located as separate masses in side by side contact or discrete portions of one component may be intermingled with the other component. If desired, in order to provide further protection against possible contact of the active ingredients of the grouting composition resulting from rough handling during storage, a film barrier may be provided between the components of the grouting composition, but this barrier may be made from readily frangible, permeable material such as cellulose or cellulose derivative rather than the tough synthetic plastics film previously used as the internal casing in grouting capsules.

The oil phase of the water-in-oil emulsion may conveniently comprise any of the readily available liquid hydrocarbons for example kerosene, diesel oil, white mineral oil, toluene, xylene or styrene. In emulsions containing styrene the styrene may, if desired, be polymerised for example with a free radical catalyst to impart additional thickness and/or strength to the continuous phase of the emulsion. The oil phase may be thickened by means of one or more congealing agents, for example, paraffin wax, carnauba wax, microcrystalline wax or bees wax, or one or more thickening agents such as ethylene/vinyl acetate copolymer or a styrene/-maleic anhydride copolymer. The proportion of oil required in the emulsion is small compared to the weight of the dispersed phase and is preferably in the range from 4 to 12% by weight of the emulsion.

The dispersed phase of the water-in-oil emulsion comprises an active ingredient of the grouting system. In certain systems the active ingredient may be water but more commonly it is another reagent which is contained in and preferably dissolved in water or other polar liquid in the dispersed phase. The reagent solution may advantageously be prepared and emulsified at an elevated temperature so that, at ambient temperature, the dispersed phase remains super-saturated with the reagent thereby giving stronger grouting compositions having reduced gelling times due to the reduced concentration of solvent. If desired the disperse phase may contain an inert filler or it may be thickened to improve its stability. Suitable thickening agents include guar gum, polyacrylamide or xanthan gum. The thickening agent may advantageously be gelled, for example guar gum may be gelled with a chromate or pyroantimonate and polyacryl amide may be gelled by means of an aluminium salt. The polyacryl amide may be formed in situ in the dispersed phase by polymerising acrylamide by reaction with ammonium persulphate.

The emulsion contains a water-in-oil emulsifier, of which many examples are known. Convenient emulsifiers include sorbitan or glycerol esters prepared from long chain saturated or unsaturated carboxylic acids, substituted imidazolines having a long chain saturated or unsaturated substituent, long chain saturated or unsaturated amines, ethoxylated long chain alcohols, and long chain saturated or unsaturated carboxylic acid and carboxylate salts wherein the long chains preferably contain 8 to 24 carbon atoms. Preferred emulsifiers include sorbitan sesquioleate and oleylamine. The emulsion may also advantageously contain an emulsion stabiliser. Especially effective stabilisers include poly-12-hydroxystearic acid and A-B-A block co-polymers wherein a represents poly-12-hydroxystearic acid and B represents polyethylene glycol, the molecular weights of A and B both being in the range 1000 to 3000 and preferably being about 1500.

The components of the grouting system which are not in the form of a water-in-oil emulsion containing the active ingredient may conveniently be in the form of a powdered solid, liquid, solution, paste or slurry. Where the component contains a liquid, the liquid may be thickened or gelled with a suitable gelling agent as previously described for the dispersed phase of the emulsion or it may contain an inert filler such alumina.

In order to prevent water or other small molecules diffusing through the oil between the dispersed phase of the emulsion and aqueous liquids in a further contacting component of the grouting composition it is sometimes advantageous to balance the activities of solutions in contacting components by the addition of an appropriate amount of a salt, for example sodium chloride or sodium sulphate, to the aqueous liquid in one of the components.

Two-component systems which may be advantageously prepared in accordance with the invention comprise the following active ingredients:

| | Component 1 | Component 2 (as water-in-oil emulsion if component 1 is not an emulsion) |
|---|---|---|
| A | Polyester resin | Aqueous solution of hardening catalyst e.g. ammonium persulphate. |
| B | Epoxy resin | Aqueous solution of diethylene-triamine monoacetate. |
| C | Portland cement or Plaster of Paris as powder or slurried in non-aqueous liquid e.g. trichlorethylene. | Water. |
| D | Plaster of Paris/water, set-retarded with poly-acrylic acid and/or a derivative thereof. | Aqueous solution of a salt of copper, iron or aluminium e.g. cupric sulphate. |
| E | Zinc oxide or magnesium oxide slurry in water. | Aqueous solution of zinc chloride or magnesium chloride |
| F | Zinc oxide or magnesium oxide slurry in water. | Aqueous solution of phosphoric acid. |
| G | Aqueous sodium silicate optionally as water-in-oil emulsion. | Solution or suspension of calcium salt e.g. calcium chloride or calcium sulphate. |
| H | Aluminium silicate slurry in water. | Aqueous solution of poly-acrylic acid. |

The invention also includes a method of preparing a multi-component grouting composition wherein an aqueous solution of the active ingredient of one component of the composition is emulsified with oil as a water-in-oil emulsion and the emulsion is placed in a container with the other component or components of the composition, the components advantageously being in direct contact. In this context the container may be the drillhole wherein the grouting composition is required to harden but more commonly it will be a single compartment frangible capsule. When the components are pourable or extrudable they may be advantageously loaded simultaneously through two nozzles or a twin aperture nozzle inserted into the container.

From another aspect the invention consists in a method of forming a hardened grouting material in a cavity in which method of multi-component grouting composition wherein at least one of the components contains its active ingredient in the form of a water-in-oil emulsion, is placed in the cavity, the components advantageously being in direct contact, and the grouting composition is stirred to establish shear conditions in the components sufficient to break the emulsion and permit reaction between the active ingredients of the composition. Stirring may advantageously be effected by rotation of a reinforcement element such as a bolt or dowel which it is desired to secure in the cavity by the hardened grouting material.

The invention is further illustrated by the following Examples wherein all parts and percentages are given by weight.

EXAMPLE 1

Component 1 was prepared by mixing together 100 parts of α-gypsum (Plaster of Paris) and 38 parts of water containing 0.4 parts of dissolved hydroxypropyl methyl cellulose (2% aqueous solution viscosity 450 cps at 20° C.) and 0.35 parts of the sodium salt of polyacrylic acid (molecular weight 3,500).

Component 2 was a water-in-oil emulsion wherein the dispersed phase was a solution containing 15 parts of cupric sulphate pentahydrate and 85 parts of water. The oil phase contained 2.5 parts of refined mineral oil (average M.W. 390) 2.5 parts of paraffin wax (MP 51° C.) and, as emulsion stabiliser, 2.5 parts of an A-B-A block copolymer wherein the A parts were poly-12-hydroxystearic acid having molecular weight of 1500 and the B part was poly-ethylene glycol having a molecular weight of 1500. The water-in-oil emulsifier was 2.5 parts of sorbitan sesquioleate. The emulsion was prepared by mixing the ingredients of the oil phase and the emulsifier together and adding the solution of the dispersed phase slowly with rapid stirring at 50° C. until emulsification was effected.

The grouting composition was prepared by placing 80 parts of Component 1 and 20 parts of Component 2 together in side-by-side contact in the bottom of a 40 mm diameter drillhole in a concrete block. There was no reaction between the components until the components were mixed together and the emulsion broken by rotating a 30 mm diameter ribbed steel bolt inserted into the composition in the drillhole. When mixing was complete the bolt was allowed to remain in the drillhole where it was firmly grouted in position by a 25 cm length of hardened grouting composition. The composition gelled about 10 minutes after mixing, fixing the bolt firmly in position. After 24 hours the anchorage strength, measured by the axial pull on the bolt required to break the grout was more than 7 tons (2.8 kN/cm of grout).

EXAMPLE 2

Grouting system Components 1 and 2 prepared as described in Example 1 were extruded simultaneously through coaxial nozzles into a 37 mm diameter tube made from 0.025 mm thick polyethylene terephthalate to place 80 parts of component 1 in contact with and surrounding. 20 parts of component 2. The tube was divided into 25 cm long cartridges and the cartridges were stored for 3 months. There was no evidence of any setting of the mixture nor of any diffusion of cupric ions into component 1.

Cartridges as freshly prepared and after 3 months storage were placed at the bottom of 40 mm diameter drillholes in concrete blocks, one cartridge in each drillhole. The container film was ruptured and the components mixed together by shearing with a ribbed steel bolt rotated in the drillholes as described in Example 1, the bolt subsequently remaining in the grouting composition. In all cases the grouting composition had gelled 10 minutes after mixing, grouting the bolt firmly in the drillhole. The anchorage strength 24 hours after mixing was in all cases more than 7 tons (2.8 kN/cm of grout).

EXAMPLE 3

Component 1 was a water-in-oil emulsion wherein the dispersed phase was 470 parts of 50% aqueous sodium silicate solution (water glass - $Na_2O$, 2 $SiO_2$). The oil phase contained 7.5 parts of white mineral oil, 6.0 parts of paraffin wax (M.P. 51° C.) and as emulsion stabiliser, 5.0 parts of poly-12-hydroxystearic acid. The emulsifier was 9.0 parts of oleylamine.

Component 2 was also a water-in-oil emulsion wherein the dispersed phase was 400 parts of calcium chloride solution saturated at 25° C. The oil phase contained 7.5 parts of white mineral oil, 5.0 parts of paraffin wax (MP 51° C.) and, as emulsion stabiliser, 5.0 parts of A-B-A block copolymer as used in component 2 of Example 1. The emulsifier was 9.0 parts of sorbitan sesquioleate.

The grouting composition was prepared by placing 2 parts of Component 1 and 1 part of Component 2 in contact. There was no reaction or diffusion of ingredients between the components. After mixing under shear conditions to break the emulsion and mix the active ingredients (the sodium silicate and calcium chloride) intimately the composition gelled within one minute.

When the components were encapsulated in contact and tested as a bolt anchor as described in Example 2 the anchorage strength was 0.5 kN/cm of grout.

EXAMPLE 4

Component 1 was a slurry consisting of 350 parts of powdered magnesium oxide and 150 parts of water.

Component 2 was a water-in-oil emulsion wherein the dispersed phase contained 300 parts of magnesium chloride hexahydrate and 150 parts of water. The oil phase contained 9.5 parts of white mineral oil, 5.0 parts of paraffin wax (MP 51° C.) and 5.0 parts of the block copolymer as used in Component 2 of Example 1. The emulsifier was 9.5 parts of sorbitan sesquioleate.

The grouting composition was prepared by placing 2 parts of Component 1 and 1 part of Component 2 in contact. No reaction occurred between the components. After mixing under shear conditions to break the emulsion the composition set to a hard mass within 24 hours.

When the components were encapsulated in contact and tested as a bolt anchor as described in Example 2, the anchorage strength was greater than 2.8 kN/cm of grout.

EXAMPLE 5

Component 1 was a slurry containing 50 parts of alumina and 80 parts of an aqueous sodium silicate solution (as used in Example 3).

Component 2 was a water-in-oil emulsion having the same composition as Component 2 of Example 3.

The grouting composition was prepared from 130 parts of Component 1 and 2.5 parts of Component 2. No reaction or diffusion of the ingredients was observed until after mixing under shear conditions when the composition gelled to a firm grout almost immediately.

When the components were encapsulated in contact and tested as a bolt anchor as described in Example 2 the anchorage strength was 0.5 kN/cm of grout.

EXAMPLE 6

Component 1 was a paste containing 100 parts of quartz powder and 100 parts of a water-in-oil emulsion wherein the dispersed phase contained 2 parts of polymerisation promoter consisting of a 10% solution of sodium dithionate in water, the continuous phase contained 90 parts of a commercial polyester resin composition (Leguval K 27 Registered Trademark) wherein the polyester was dissolved in styrene monomer and the emulsifier was 8 parts of diethoxylated lauryl alcohol.

Component 2 was a water-in-oil emulsion wherein the dispersed phase was an aqueous solution of ammonium persulphate containing 40% ammonium persulphate. The oil phase contained 2.5 parts of white mineral oi, 2.0 parts of paraffin wax (MP 51° C.) and, as emulsion stabiliser, 2.0 parts of the A-B-A block copolymer as used in Component 2 of Example 1. The emulsifier was 3.0 parts of sorbitan sesquioleate.

The grouting composition was prepared by placing 200 parts of Component 1 and 6.5 parts of Component 2 in contact. There was no reaction or diffusion between the components until the components were mixed under shear conditions to break the emulsion. After mixing the composition gelled within 15 minutes. When the components were encapsulated in contact and tested as a bolt anchor as described in Example 2 the anchorage strength was greater than 2.8 kN/cm of grout.

EXAMPLE 7

Component 1 was the same as Component 1 of Example 1.

Component 2 was a water-in-oil emulsion wherein the dispersed phase was a solution containing 35 parts of cupric sulphate pentahydrate and 65 parts of water. The oil phase contained 2.5 parts of refined mineral oil having an average molecular weight of 390, and 2.5 parts of an A-B-A block copolymer as used in Example 1. The emulsifier was 2.5 parts of glycerol mono-oleate. The emulsion was prepared by dissolving the cupric sulphate pentahydrate in the water at 80° C. The components of the oil phase and the emulsifier were mixed and also heated to 85° C. The aqueous phase was slowly added to the oil phase at 85° C. with rapid stirring until emulsification was effected. On cooling the dispersed phase remained supersaturated showing little sign of crystallisation.

The grouting composition was prepared by placing 90 parts of Component 1 and 10 parts of Component 2 together in side-by-side contact in the bottom of a 40 mm diameter drillhole in a concrete block. There was no reaction between the components until the components were mixed together and the emulsion broken by rotating a 30 mm diameter ribbed steel bolt inserted into the composition in the drillhole. When mixing was complete the bolt was allowed to remain in the drillhole where it was firmly grouted in position by a 25 cm length of set grouting composition. The composition gelled in about 10 minutes after mixing, fixing the bolt firmly in position. After 24 hours the anchorage strength, measured as described in Example 1, was more than 10 tons (4 kN/cm of grout). When the components were encapsulated in contact and tested as a bolt anchor as described in Example 2 the anchorage strength was greater than 4 kN/cm of grout.

EXAMPLE 8

Component 1 was a water-in-oil emusion wherein the oil phase contained 7.5 parts of styrene, 5.0 parts of poly-12-hydroxystearic acid (molecular weight 3000), 2.5 parts of paraffin wax (MP 51° C.) and 2.5 parts of microcrystalline wax (MP 63°-65° C.). The emulsifier was 9.0 parts of oleylamine and the dispersed phase was 470 parts of 50% aqueous sodium silicate solution (as used in Example 3). The emulsion was prepared by mixing the ingredients of the dispersed phase with the oil phase and the emulsifier at 60° C.

Component 2 was a paste containing 60 parts of gypsum and 40 parts of liquid chlorinated paraffin wax (Cereclor 70 L supplied by Imperial Chemical Industries PLC).

The grouting composition was prepared by placing a mixture containing 50 parts of Component 1, 20 parts of Component 2 and 30 parts of fine quartz in the bottom of a 40 mm diameter drillhole. There was no reaction between the components until they were mixed by a ribbed steel bolt as described in Example 1 after which the anchorage strength measured as described in Example 1 was more than 7 tons (2.8 k/N cm of grout).

When the components were encapsulated in contact and tested as a bolt anchor as described in Example 2 the anchorage strength was greater than 2.8 kN/cm of grout

EXAMPLE 9

Component 1 was a slurry of 65 parts of heavy magnesium oxide and 35 parts of water.

Component 2 was a water-in-oil emulsion prepared by adding with mixing a hot (80° C.) solution of 270 parts of magnesium chloride hexahydrate in 100 parts of water to an oil phase consisting of 7 parts of Slackwax 431 (a petroleum product available from International Waxes Limited, Agincourt, Ontario), 7 parts kerosene and 7.5 parts of sorbitan sesquioleate.

100 parts of Component 1 and 30 parts of Component 2 mixed together for 30 seconds in a drillhole and tested as described in Example 1 had an anchorage strength of greater than 3.5 tons (1.4 kN/cm of grout) for a 25 cm length of grout.

EXAMPLE 10

Component 1 was a water-in-oil emulsion prepared by adding with vigorous mixing a solution of 200 parts of magnesium chloride hexahydrate in 200 parts of water to a mixture of 8 parts of Slackwax 431, 8 parts of kerosene and 8 parts of sorbitan sesquioleate.

Component 2 was dry heavy magnesium oxide.

100 parts of Component 1 were mixed with 100 parts of Component 2 and tested as described in Example 1 The mix had gelled after 7 hrs and after 48 hrs had an anchorage strength of 3.5 tons (1.4 kN/cm of grout) for a 25 cm length of grout.

EXAMPLE 11

Component 1 was a water-in-oil emulsion prepared by adding 300 parts by weight of water with mixing to 14 parts of 'Extra Light Yellow' petrolatum (ex Witco Chemicals), 4 parts kerosene and 7.5 parts sorbitan sesquioleate.

Component 2 was dry Portland cement powder.

50 parts of Component 1 mixed with 175 parts of Component 2 gelled after 90 minutes and had an anchorage strength measured as described in Example 1 of greater than 2 tons (0.8 kN/cm of grout) for a 25 cm grout after 48 hrs.

EXAMPLE 12

The procedure described in Example 1 was repeated except that the cupric sulphate pentahydrate was replaced by ferric chloride hexahydrate.

The anchorage strength measured as described in Example 1 was greater than 7 tons (2.8 kN/cm of grout) for a 35 cm grout.

EXAMPLE 13

The procedure described in Example 1 was repeated except that the cupric sulphate pentahydrate was replaced by aluminium sulphate (anhydrous).

The anchorage strength measured as described in Example 1 was greater than 7 tons (2.8 kN/cm of grout) for a 25 cm length of grout.

EXAMPLE 14

A water-in-oil emulsion (Component 1) was prepared by emulsifying a mixture of 53 parts diethylene triamine, 30 parts of acetic acid and 50 parts of water in a mixture of 5 parts of kerosene, 10 parts of unrefined petrolatum and 7.5 parts of 2-heptadecenyl -4,4 bis (hydroxymethyl) oxazoline.

65 parts of a commercial epoxy resin (Component 2 ARALDITE Registered Trade Mark) and 35 parts of the emulsion were placed together in the bottom of a 40 mm diameter drillhole in a concrete block. There was no reaction between the components until they were mixed together by the insertion of a 30 mm diameter steel bolt into the drillhole as described in Example 1. The axial pull on the bolt required to break a 25 cm grout of the composition was more than 7 tons (2.8 kN/cm of grout)

EXAMPLE 15

Component 1 was a water-in-oil emulsion prepared by adding with rapid stirring 100 parts of 60% phosphoric acid solution, containing 5% dissolved aluminium phosphate and 3% dissolved zinc phosphate, to a mixture of 10 parts of kerosene, 2 parts octadecenylamine and 5 parts of octadecenyl diethylene glycol ether.

The grouting composition consisted of 35 parts of the emulsion and 65 parts of a 9:1 mixture of zinc oxide and aluminium oxide (Component 2).

The anchorage strength, measured as described in Example 1, was greater than 3.5 tons (1.4 kN/cm of grout).

EXAMPLE 16

Component 1 was a water-in-oil emulsion prepared by adding 100 parts of a 25% solution of polyacrylic acid (molecular weight 7500), with stirring to a mixture of 10 parts of kerosene and 7.5 parts of sorbitan sesquioleate.

Component 2 was a cement powder containing $SiO_2$: $Al_2O_3$: CaO: $CaF_2$ in the ratios (w/w) of 36.0: 30.0; 26.0:8.0.

The grouting composition consisted of 25 parts of Component 1 and 75 parts of Component 2. The components were placed together in a 40 mm diameter borehole. On mixing with a 30 mm diameter ribbed steel bolt the grouting composition had set after 24 hrs.

The anchorage strength measured as described in Example 1, was greater than 3.5. tons (1.4 kN/cm of grout).

I claim:

1. A storable packaged multi-component grouting system wherein the components are disposed in direct side-by-side contact in a single-compartment frangible casing, said components providing a setting composition when the components are intimately mixed together, said grouting system comprising: a first component which is a water-in-oil emulsion, said emulsion comprising a polar liquid as the dispersed phase in a liquid of lower dielectric constant, at least one active ingredient of the grouting system being contained in the dispersed phase of said emulsion; and a second component containing at least one other active ingredient reactable with said one active ingredient to produce the setting composition, said components being disposed in direct contact with each other, the oil phase of said emulsion being inert to the second component and forming a frangible barrier between the two active ingredients thus preventing the formation of a setting composition until the two components are intimately mixed with each other and the emulsion broken.

2. A grouting system as claimed in claim 1 wherein each component comprises an active ingredient of a two-component hardening grouting system wherein the first component comprises Portland cement and a second component comprising water.

3. A grouting system as claimed in claim 1 wherein each component comprises an active ingredient of a two-component hardening grouting system having a first component comprising Plaster of Paris and a second component comprising water.

4. A grouting system as claimed in claim 1 wherein each component comprises an active ingredient of a two-component hardening grouting system having a first component comprising an oxide slurried in water, said oxide being selected from the group consisting of zinc oxide and magnesium oxide and a second component comprising a reagent selected from the group consisting of zinc chloride, magnesium chloride and phosphoric acid.

5. A grouting system as claimed in claim 1 wherein each component comprises an active ingredient of a two-component hardening grouting system having a first component comprising aqueous sodium silicate and a second.

6. A grouting system as in claim 1 wherein the oil phase of the water-in-oil emulsion comprises an oil selected from the group consisting of toluene, xylene or styrene.

7. A grouting system as in claim 6 wherein the oil phase is thickened with a congealing agent or a thickening agent selected from the group consisting of paraffin wax, carnuba wax, microcrystalline wax, bees wax, ethylene/vinyl acetate copolymers and styrene/maleic anhydride copolymers.

8. A grouting system as in claim 1 wherein each component comprises an active ingredient of a two-component hardening grouting system having a first component comprising an epoxy resin and a second component comprising an aqueous solution of diethylene triamine monoacetate.

9. A grouting system as in claim 1 wherein each component comprises an active ingredient of a two-component hardening grouting system having a first component comprising a mixture of Plaster of Paris and water set-retarded with a set-retarding agent selected from the group consisting of polyacrylic acid and derivatives thereof and a second component comprising an aqueous solution of a salt selected from the group consisting of copper, iron and aluminum salts.

10. A grouting system as in claim 1 wherein each component comprises an active ingredient of a two-component hardening grouting system having a first component comprising aluminum silicate and a second component comprising an aqueous solution of polyacrylic acid.

11. A grouting system as claimed in claim 1 wherein the oil phase of the water-in-oil emulsion comprises an oil selected from the group consisting of kerosene, diesel oil on white mineral oil, 12. A grouting system as claimed in claim 11 wherein the oil phase comprises polymerised styrene.

13. A grouting system as claimed in claim 11 wherein the oil phase is thickened with a congealing agent or a thickening agent selected from the group consisting of paraffin wax, carnauba wax, microcrystalline wax, bees wax, ethylene/vinyl acetate copolymers, and styrene/maleic anhydride copolymers.

14. A grouting system as claimed in claim 1 wherein the proportion of oil in the emulsion is in the range from 4 to 12% by weight.

15. A grouting system as claimed in claim 1 wherein the dispersed phase of the water-in-oil emulsion comprises water or other polar liquid thickened with a thickening agent selected from the group consisting of guar gum, polyacrylamide and xanthan gum.

16. A grouting system as claimed in claim 1 wherein the dispersed phase is super-saturated with the active ingredient.

17. A grouting system as claimed in claim 1 wherein the water-in-oil emulsion contains an emulsifier selected from the group consisting of sorbitan and glycerol esters of long chain saturated and unsaturated carboxylic acids, substituted imidazolines having a long chain saturated and unsaturated substituent, long chain saturated and unsaturated amines, ethoxylated long chain alcohols, and long chain saturated and unsaturated carboxylic acid and carboxylate salts.

18. A grouting system as claimed in claim 10 wherein the emulsifier is selected from the group consisting of sorbitan sesquioleate and oleylamine.

19. A grouting system as claimed in claim 1 wherein the emulsion contains an emulsion stabiliser selected from the group consisting of poly-12-hydroxystearic acid and A-B-A block copolymers wherein A represents poly-12-hydroxystearic acid and B represents polyethylene glycol, the molecular weights of A and B both being in the range 1000 to 3000.

20. A grouting system as claimed in claim 1 wherein at least one component is in the form of a powdered solid, liquid, solution, paste or slurry.

21. A grouting system as claimed in claim 1 wherein each component comprises an active ingredient of a two-component hardening grouting system having a first component comprising a polyester resin and a second component comprising a hardening catalyst for said resin.

22. A method of preparing a multi-component grouting composition wherein an aqueous solution of the active ingredient of one component of the composition is emulsified with oil as a water-in-oil emulsion and the emulsion and the other components are placed in direct side-by-side contact in a single-compartment frangible casing.

23. A method as claimed in claim 22 wherein the components are placed in direct contact.

24. A method of forming a hardened grouting material in a cavity which comprises placing the frangible caging as claimed in any one of claims 4 to 14 inclusive in the cavity, and stirring the components to establish shear conditions in the components sufficient to break the emulsion and to permit reaction between the active ingredients of the components.

25. A method as claimed in claim 24 wherein the grouting composition is stirred by rotating a reinforcement element within the cavity, which element is secured in the cavity when the grouting composition hardens.

* * * * *